US012604187B2

(12) United States Patent
Hattiholi et al.

(10) Patent No.: US 12,604,187 B2
(45) Date of Patent: Apr. 14, 2026

(54) PRE-AUTHENTICATION FOR SHORT-RANGE WIRELESS COMMUNICATIONS WITH PERIPHERAL DEVICES

(71) Applicant: ZEBRA TECHNOLOGIES CORPORATION, Lincolnshire, IL (US)

(72) Inventors: Sandeep Hattiholi, Bengaluru (IN); Punith Gangadhara, Davanagere (IN); Chiranjeevi Kamakshipalya Hanumanthaiah, Bangalore (IN); Pramoda C S, Bangalore (IN)

(73) Assignee: Zebra Technologies Corporation—Lincolnshire, IL, Lincolnshire, IL (US)

( * ) Notice: Subject to any disclaimer, the term of this patent is extended or adjusted under 35 U.S.C. 154(b) by 430 days.

(21) Appl. No.: 18/105,423

(22) Filed: Feb. 3, 2023

(65) Prior Publication Data
US 2024/0267729 A1 Aug. 8, 2024

(51) Int. Cl.
| H04W 12/062 | (2021.01) |
| H04W 12/041 | (2021.01) |
| H04W 12/50 | (2021.01) |

(52) U.S. Cl.
CPC ....... *H04W 12/062* (2021.01); *H04W 12/041* (2021.01); *H04W 12/50* (2021.01)

(58) Field of Classification Search
None
See application file for complete search history.

(56) References Cited

U.S. PATENT DOCUMENTS

2022/0022030 A1* 1/2022 Kumar ................ H04L 63/0442
2022/0321328 A1* 10/2022 Tsarfati ................ H04L 9/0822

* cited by examiner

*Primary Examiner* — Frantz Bataille
(74) *Attorney, Agent, or Firm* — Dimitry Kapmar

(57) ABSTRACT

A method in a host computing device of establishing a short-range wireless connection with a peripheral device includes: responsive to detecting the peripheral device, initiating a pairing mechanism with the peripheral device; exchanging attribute data with the peripheral device; in response to determining, based on the attribute data, that the peripheral device supports a pre-authentication mechanism, exchanging pre-authentication data with the peripheral device; based on the exchanged pre-authentication data, selecting either (i) a first pairing action or (ii) a second pairing action; and controlling the pairing mechanism according to the selected one of the first pairing action and the second pairing action.

20 Claims, 7 Drawing Sheets

100

100

104-1

124-1
Memory 148-1

128-1
Comms.
Interface 132-1
Controller 136-1
Secure
Storage 120-1
Processor

140
Display

112

104-2

124-2
Memory 148-2

128-2
Comms.
Interface 132-2
Controller 136-2
Secure
Storage 120-2
Processor

144
Sensor 104-1

140

Non-authenticated
peripheral detected:

MAC: 2D:13:09:1B:7C:E2
Name: Mallory_scanner

Complete pairing?

Yes     No

PRE-AUTHENTICATION FOR SHORT-RANGE WIRELESS COMMUNICATIONS WITH PERIPHERAL DEVICES

BACKGROUND

Mobile computing devices such as tablet computers, smart phones, wrist-mounted computers, and the like, can be employed with a variety of peripheral devices such as printers, barcode scanners, and the like. A peripheral such as a barcode scanner can be operated by wireless pairing the scanner with a host mobile computer (e.g., via Bluetooth™ or another suitable short-range wireless communications standard), following which the scanner can be configured to send scan results to the host mobile computer for downstream processing. Wireless pairing of such peripherals, however, can present security risks to the host mobile computer, and/or involve time-consuming administrative burdens on the operator of the mobile computer.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
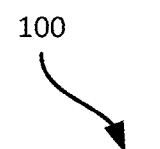
FIG. 1 is a diagram of a system for pre-authentication for short-range communications.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a host computing device of establishing a short-range wireless connection with a peripheral device, the method comprising: responsive to detecting the peripheral device, initiating a pairing mechanism with the peripheral device; exchanging attribute data with the peripheral device; in response to determining, based on the attribute data, that the peripheral device supports a pre-authentication mechanism, exchanging pre-authentication data with the peripheral device; based on the exchanged pre-authentication data, selecting either (i) a first pairing action or (ii) a second pairing action; and controlling the pairing mechanism according to the selected one of the first pairing action and the second pairing action.

Additional examples disclosed herein are directed to a computing device, comprising: a communications interface; and a controller configured to: responsive to detecting a peripheral device, initiate a pairing mechanism with the peripheral device; exchange attribute data with the peripheral device; in response to determining, based on the attribute data, that the peripheral device supports a pre-authentication mechanism, exchange pre-authentication data with the peripheral device; based on the exchanged pre-authentication data, select either (i) a first pairing action or (ii) a second pairing action; and control the pairing mechanism according to the selected one of the first pairing action and the second pairing action.

FIG. 1 illustrates a system 100 for short-range communications between devices. The system 100 includes a host computing device 104-1, such as a tablet computer, a laptop computer, a wrist-mounted computer, a smartphone, or the like. The system 100 also includes a peripheral device 104-2, such as a barcode scanner (e.g., a ring scanner configured to be mounted on a hand of an operator, a pistol-grip scanner, or the like), a printer (e.g., a portable label printer), or the like. An operator of the host device 104-1 may also operate the peripheral device 104-2 to perform a wide variety of tasks, e.g., in which the peripheral device 104-2 extends the range of functions available to the host device 104-1. For example, when the peripheral device 104-2 is a barcode scanner, the operator can use the peripheral device 104-2 to scan barcodes on packages in a transport and logistics facility, products in a retail facility, or the like. The barcodes decoded by the peripheral device 104-2 can be provided to the host device 104-1 for further processing, e.g., uploading to a central database, retrieving and displaying information corresponding to the barcode, and the like.

More generally, the peripheral device 104-2 can be configured to capture data 112 (such as object identifiers decoded from barcodes) and transmit the data to the host device 104-1 for further processing. In other examples, the peripheral device 104-2 can receive data from the host device and generate labels, receipts, or the like, based on the received data.

As will be understood, the above functionality depends on the establishment of a communications link between the host device 104-1 and the peripheral device 104-2. In some examples, the communications link can be wired, e.g., implemented by a cable extending between respective communications ports of the devices 104-1 and 104-2. In other examples, the communications link is wireless, e.g., based on a short-range wireless communications standard such as Bluetooth™. When the devices 104-1 and 104-2 are configured to communicate wirelessly, the host device 104-1 can initiate a pairing mechanism specified by the relevant communications standard, through which the devices 104-1 and 104-2 exchange various information and, in some examples, store encryption keys used to secure communications during a paired communications session.

In certain deployments, to mitigate operation delays resulting from manual approval of pairing between the devices 104-1 and 104-2 (e.g., by the operator of the devices 104-1 and 104-2), the devices 104-1 and 104-2 can be configured to silently complete the above-mentioned pairing mechanism. That is, the devices 104-1 and 104-2 can be configured to complete the pairing mechanism without prompting the operator of the device 104-1 to approve the pairing. Silent pairing, although convenient for the operator, can also present a security risk, as malicious peripherals may automatically be paired with the host device 104-1 without the operator's knowledge. Some systems mitigate the security risk of silent pairing by maintaining, at the host device 104-1, a repository containing unique identifiers of specific peripherals with which the host device 104-1 is configured to silently pair. The unique identifiers may be, for example, media access control (MAC) addresses of the peripheral devices, or the like.

The repository-based mitigation mentioned above, however, is also vulnerable to potentially malicious third party peripherals impersonating legitimate peripherals, since identifiers such as MAC addresses are often transmitted and can therefore be misappropriated. Further, the above solution involves updating the repository of the host device 104-1 to enable communication with any additional peripherals. The administrative burden of managing such a repository can be significant, e.g., in facilities containing large numbers of host devices and peripherals.

The system 100 therefore implements certain functionality, discussed below, to mitigate the above security risks while also mitigating the administrative burden of maintaining repositories of approved peripheral devices. Before discussing the functionality implemented by the system 100 in detail, certain components of the devices 104-1 and 104-2 are introduced.

As shown in FIG. 1, the host device 104-1 and the peripheral device 104-2 include respective processors 120-1 and 120-2, such as central processing units (CPUs), graphics processing units (GPUs), or the like. The processors 120 are connected with respective non-transitory storage media, such as memories 124-1 and 124-2. The memories 124 can be implemented as any suitable combination of volatile and non-volatile memory elements. The processors 120 and the memories 124 can each comprise one or more integrated circuits. For example, the processor 120-2 and the memory 124-2 can be integrated components of a system on a chip (SoC), or the like.

The host device 104-1 and the peripheral device 104-2 also include respective communications interfaces 128-1 and 128-2, including any suitable combination of transceivers, antenna elements, and the like to facilitate wireless communication between the devices 104. The communication interfaces 128 can include, for example, respective controllers 132-1 and 132-2, each configured to control the other components of the corresponding interface 128 to establish communications links between the devices 104-1 and 104-2, and to exchange application data such as the data 112 between the devices 104.

In some examples, the devices 104-1 and 104-2 can also include respective secure storage elements 136-1 and 136-2, such as cryptographic controllers or the like configured to store and/or generate certain data that can be used in establishing secure communications links. In other examples, the secure storage elements 136 can be integrated with the processors 120 and/or the controllers 132.

The host device 104-1 can also include various input and output devices, including a display 140 (e.g., integrated with a touch screen in some examples). The input and output devices can also include microphones, speakers, keypads, and the like (not shown). The peripheral device 104-2 can include a wide variety of effector assemblies, such as a sensor 144 (e.g., an image sensor or the like when the peripheral device 104-2 is a barcode scanner), or a print head and associated hardware elements for printing labels or the like. Various other effectors will also be apparent to those skilled in the art.

The respective memories 124 of the devices 104 can store computer-readable instructions, e.g., in the form of applications 148-1 and 148-2. The application 148-2, for example, can be executed by the processor 120-2 to process data captured by the sensor 144, detect and decode barcodes in the sensor data, and transmit the decoded data 112 to the host device 104-1. The application 148-1 can, for example, be configured to receive the data 112 from the peripheral device 104-2 (or from any other suitably paired peripheral), and present the data 112 on the display 140, as well as transmit the data 112 to a server (not shown) or other computing device for storage and/or further processing.

Figure 2:
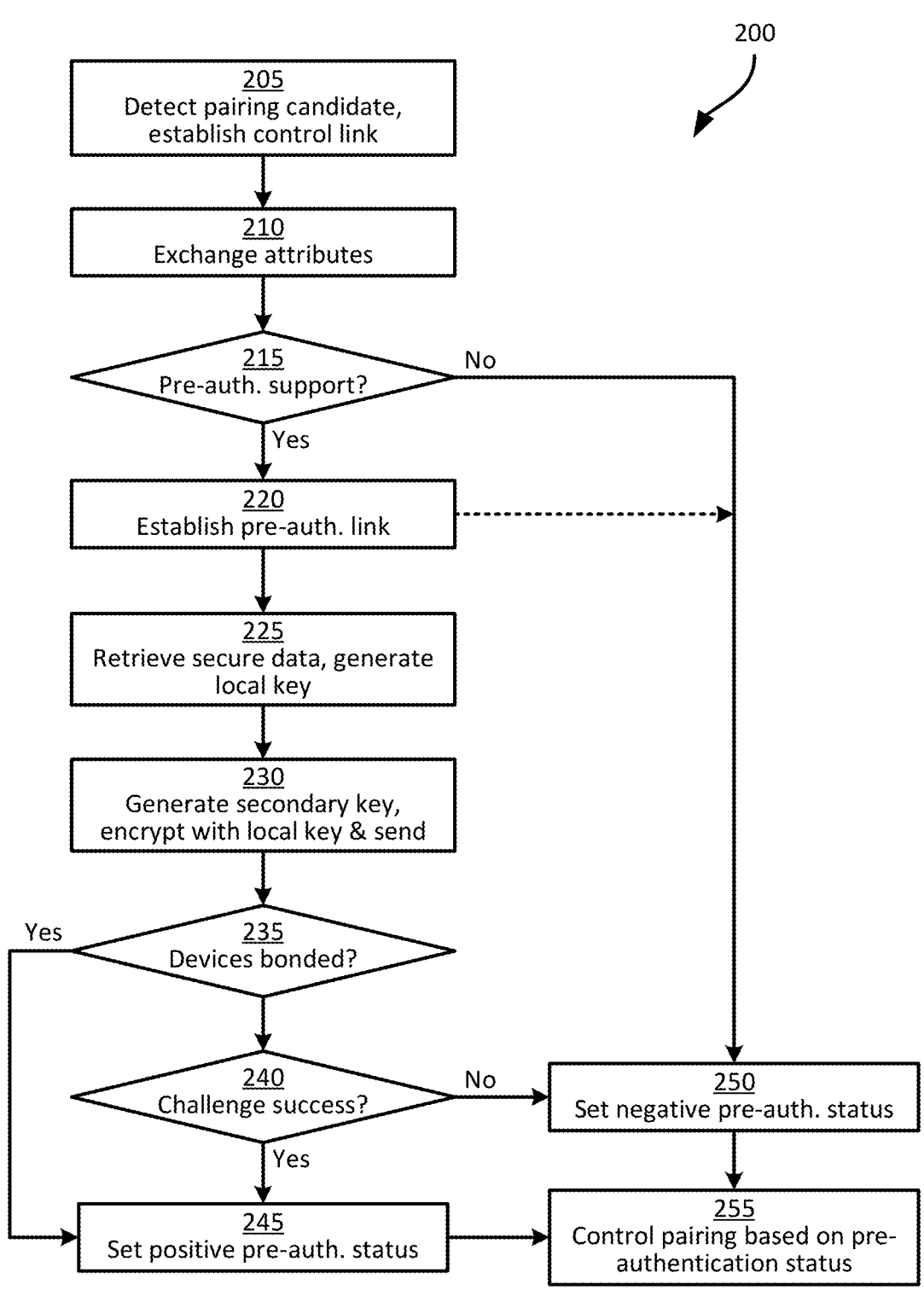
FIG. 2 is a flowchart of a method for pre-authentication for short-range communications.

Turning to FIG. 2, a method 200 for pre-authenticating peripheral devices (such as the device 104-2) at the host device 104-1 is illustrated. The method 200 is discussed below in conjunction with performance of the method 200 by the host device 104-1, e.g., via the execution of computer-readable instructions stored or otherwise implemented at the controller 132-1, and/or computer-readable instructions stored in the memory 124-1 for execution by the processor 120-1.

As discussed below, the pre-authentication functionality implemented via the method 200 enhances the pairing mechanism of communications standards such as Bluetooth™, and produces a positive or negative pre-authentication status for the peripheral device 104-2, that the host device 104-1 can be configured to use to control the remainder of the standard pairing process. In other words, the pre-authentication process discussed below does not replace the standard pairing process, nor does it dictate the outcome of the standard pairing process. The pre-authentication process instead produces a status indicator at the host device 104-1, corresponding to the peripheral device 104-2, that the host device 104-1 can be configured to employ in managing the standard pairing mechanism.

At block 205, the device 104-1 (e.g., the controller 132-1 specifically) is configured to detect a pairing candidate and establish a control link with the detected pairing candidate. As will be apparent to those skilled in the art, various mechanisms are available for detecting a pairing candidate (e.g., the peripheral device 104-2) and establishing the control link. For example, the controller 132-1 can conduct a scan for candidate peripheral devices, and select a candidate for pairing based on signal strength and/or other suitable parameters. The control link can be, for example, an asynchronous connection-less (ACL) logical transport established according to the Bluetooth™ standard.

At block 210, the host device 104-1 is configured to exchange a set of attributes with the peripheral device 104-2 via the control link established at block 205. The set of attributes can be exchanged, for example, using the logical link control and adaptation protocol (L2CAP), as specified in the Bluetooth™ standard. The exchange of attributes at block 210 includes the receipt of indications of compatibility with various features of the short-range communications standard employed during the method 200 (e.g., Bluetooth™) at the host device 104-1 from the peripheral device 104-2.

Figure 3:
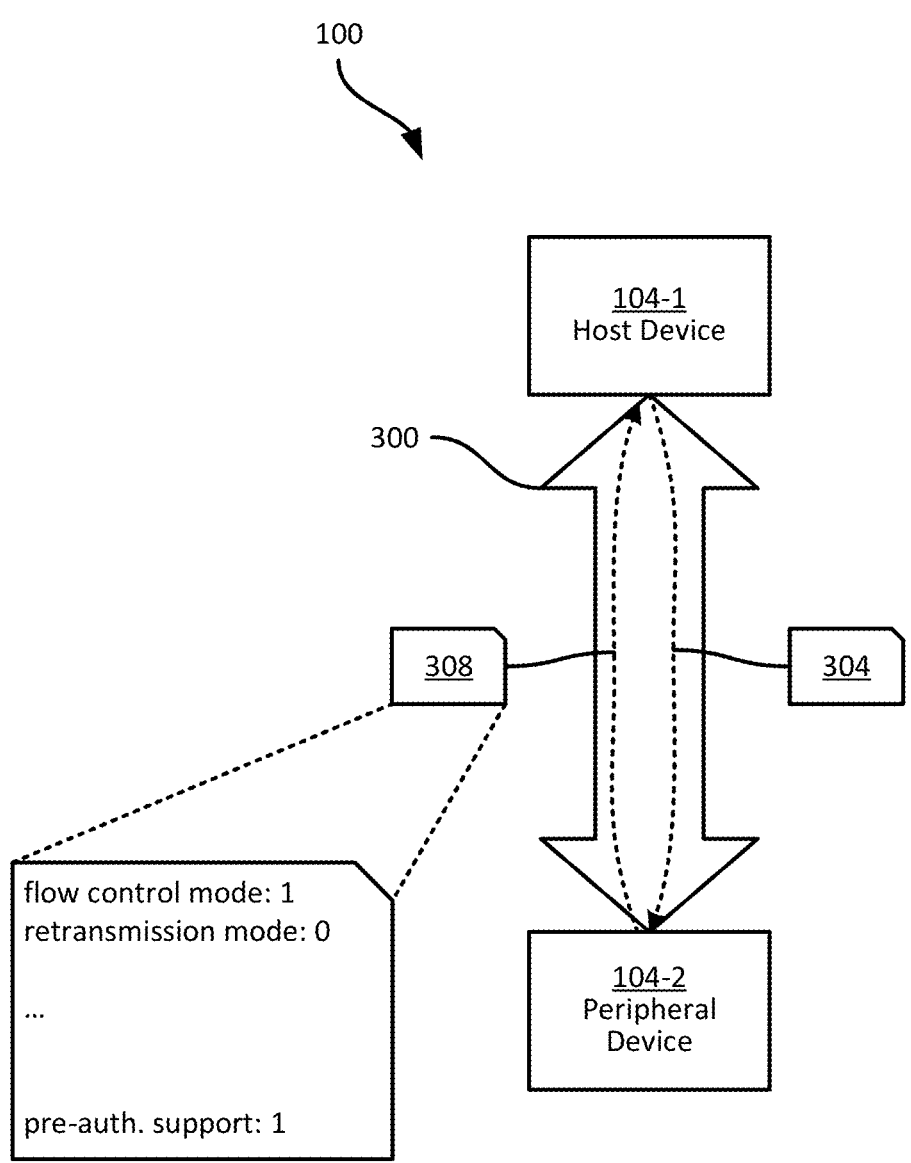
FIG. 3 is a diagram illustrating an example performance of blocks 205 and 210 of the method of FIG. 2.

Turning to FIG. 3, example performances of blocks 205 and 210 are illustrated in the system 100. In particular, the host device 104-1 is shown having established a control link 300 with the peripheral device 104-2. Over the control link 300, the host device 104-1 can transmit an attribute request

304 to the peripheral device 104-2. The attribute request can contain various attributes of the host device 104-1 itself in some examples, such as whether the host device 104-1 supports various services and/or optional features of the relevant communications standard. In response to the request 304, the peripheral device 104-2 is configured to transmit a set of attributes 308 to the host device 104-1, e.g., in a further L2CAP packet or set of packets. The response 308 can include various compatibility indications, as will be apparent to those skilled in the art, such as whether the peripheral device 104-2 supports Bluetooth™ services such as flow control mode, retransmission mode, and the like. In addition, beyond standard indications, the response 308 includes an indication of whether the peripheral device 104-2 supports a pre-authentication mechanism ("pre-auth. support" in FIG. 3). The indications in the response 308 can be presented in a wide variety of formats, such as a bit mask or other vector with each bit or set of bits corresponding to a predetermined feature. In this example, the pre-authentication support indicator is binary (e.g., the value "1" when the peripheral device 104-2 supports pre-authentication, and the value "0" otherwise). Various other values can also be employed for the indicator, however.

Returning to FIG. 2, at block 215 the host device 104-1 is configured to determine, based on the attributes exchanged at block 210, whether the peripheral device 104-2 supports the pre-authentication mechanism. When the determination at block 215 is negative (e.g., if the value for "pre-auth. support" is "0" in the response 308), the pre-authentication mechanism is omitted, and the host device 104-1 proceeds directly to block 250, at which the pre-authentication status of the peripheral device 104-2 is set to negative (e.g., not pre-authenticated). In the example illustrated in FIG. 3, however, the determination at block 215 is affirmative, and the host device 104-1 therefore proceeds to block 220.

At block 220, the host device 104-1 is configured to establish a pre-authentication link, e.g., using the control link from block 205. For example, when the communications standard used during the method 200 is Bluetooth™, the pre-authentication link can include a dedicated L2CAP channel over the ACL link 300. If the establishment of the pre-authentication link at block 220 fails, the host device 104-1 can terminate the pre-authentication mechanism and proceed to block 250, discussed further below.

In response to establishment of the pre-authentication link at block 220, the host device 104-1 is configured to exchange pre-authentication data with the peripheral device 104-2, and to select between a negative and positive pre-authentication status for the peripheral device 104-2 based on the pre-authentication data. As discussed further below, the host device 104-1 can differentially manage the pairing mechanism based on the pre-authentication status, for example by selecting one pairing action for a pre-authenticated peripheral device, and another pairing action for a peripheral device that is not pre-authenticated.

At block 225, the host device 104-1 can be configured to initiate the exchange of pre-authentication data by retrieving secure data from the secure storage element 136-1 and generating a local key based on the secure data. The secure data can include one or more numerical values, e.g., stored in the secure storage element 136-1 by the manufacturer of the host device 104-1. The secure data can include the local key itself, or one or more values from which the local key can be derived. As will be apparent, neither the secure data nor the local key are shared with the peripheral device 104-2. Instead, at block 230, the host device 104-1 is configured to generate a secondary key, encrypt the secondary key with the local key, and send the encrypted secondary key to the peripheral device 104-2.

Figure 4:
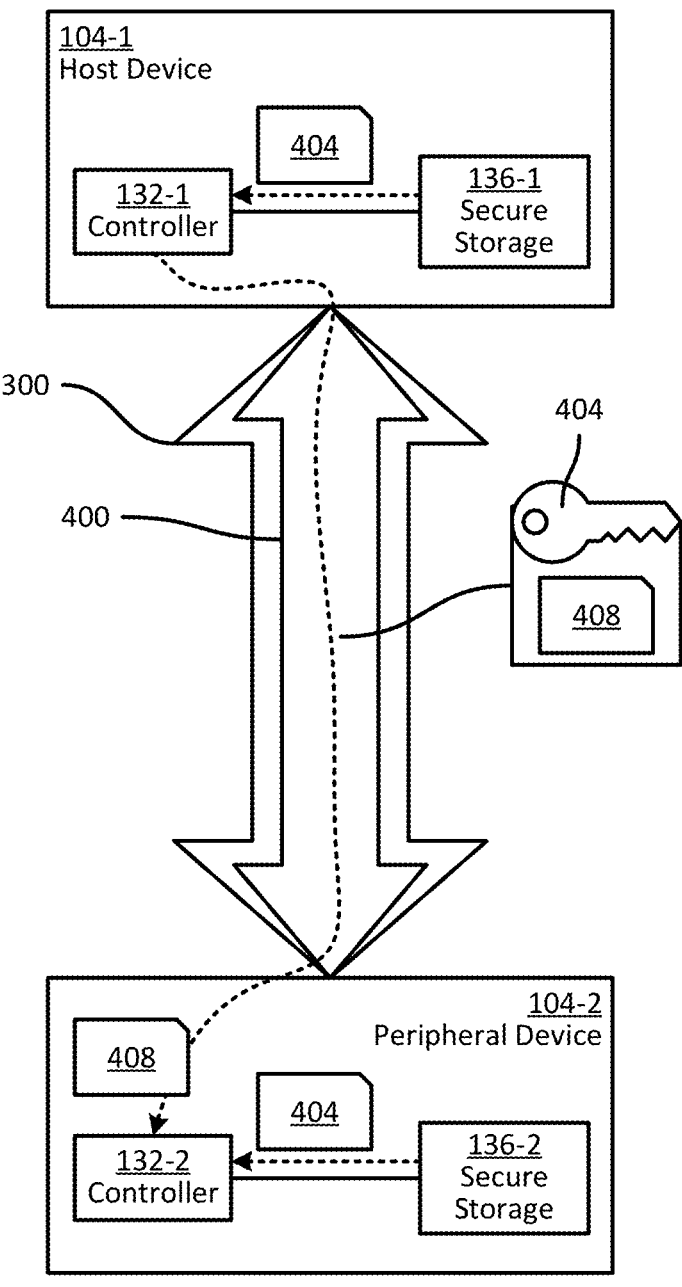
FIG. 4 is a diagram illustrating an example performance of blocks 220, 225, and 230 of the method of FIG. 2.

FIG. 4 illustrates an example performance of blocks 220, 225, and 230 of the method 200. In particular, FIG. 4 illustrates the establishment of a pre-authentication link 400 over the control link 300 from block 205. At block 225, the controller 132-1 is configured to retrieve secure data 404 from the secure storage element 136-1, and to generate a local key using the secure data 404. In the present example, the local key is the secure data 404 itself, for simplicity of illustration. The host device 104-1 is then configured, at block 230, to generate a secondary key 408 (e.g., by generating a random numerical value), and to encrypt the secondary key 408 with the local key 404 for transmission to the peripheral device 104-2.

The peripheral device 104-2, as will be apparent from the above, does not receive the local key 404 from the host device 104-1. To decrypt the secondary key 408, therefore, the peripheral device 104-2 is configured to retrieve the secure data 404 from the secure storage element 136-2 and generate the local key (that is, the same local key as generated at the host device 104-1) independently. In other words, both the host device 104-1 and legitimate peripheral devices are expected to locally store the secure data 404 (e.g., having been written to the secure storage elements 136 by a manufacturer of the devices 104). Because the secure data 404 is not transmitted by any device 104 to any other device 104, obtaining the secure data 404 is rendered difficult for a third party, e.g., attempting to pair an inauthentic peripheral device with the host device 104-1.

Upon completion of block 230, all further communications in the pre-authentication mechanism can be encrypted using at least the local key 404, and in some examples, using both the secondary key 408 and the local key 404.

Figure 5:
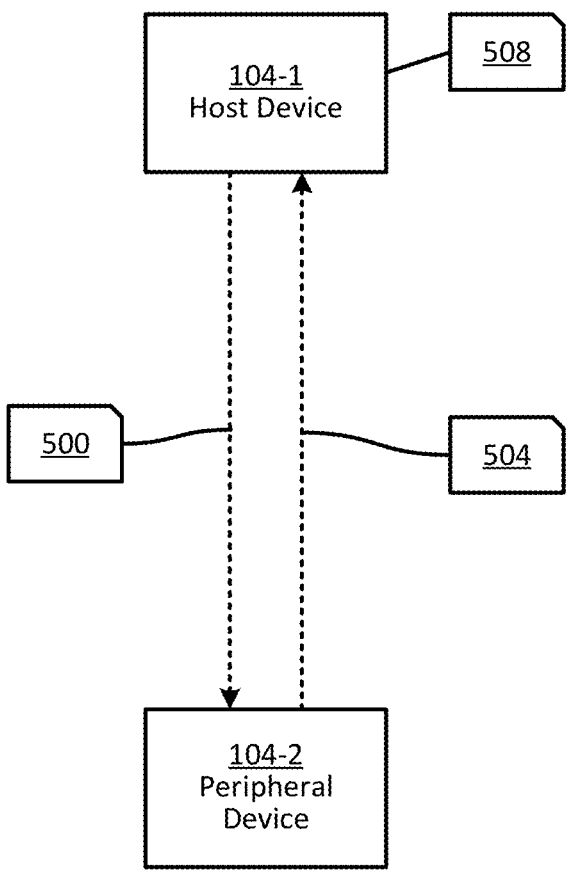
FIG. 5 is a diagram illustrating an example performance of block 235 of the method of FIG. 2.

Referring again to FIG. 2, at block 235, the pre-authentication data exchanged by the host device 104-1 with the peripheral device 104-2 can include a bonded status indicator. Specifically, the host device 104-1 can request, from the peripheral device 104-2, a bonded status indicator defining whether the peripheral device 104-2 has previously bonded (e.g., completed the pairing mechanism) with the host device 104-1. Turning to FIG. 5, for example, the host device 104-1 transmits (e.g., over the link 400, encrypted with the keys 404 and 408) a request 500 to the peripheral device 104-2 for a bonded status indicator corresponding to the host device 104-1. The peripheral device 104-2 can store, for example, in a memory associated with the controller 132-2, a list of device identifiers (e.g., MAC addresses or the like) with which the peripheral device 104-2 has successfully paired. The peripheral device 104-2 is therefore configured, in response to the request 500, to determine whether an identifier of the host device 104-1 appears in the above list, and to return a response 504 to the host device 104-1 indicating whether the devices 104-1 and 104-2 have previously been paired.

The host device 104-1 can also store a list 508 of other devices 104 that have previously been paired with the host device 104-1. The host device 104-1 can therefore, at block 235, determine whether both the response 504 and the list 508 indicate that the devices 104-1 and 104-2 have previously paired. When the determination at block 235 is affirmative, a remainder of the pre-authentication mechanism can by bypassed, and the host device 104-1 can proceed directly to block 245, setting a positive pre-authentication status for the peripheral device. When the determination at block 235 is negative, however, the exchange of pre-authentication data can proceed to block 240.

At block 240, the host device 104-1 can be configured to send a cryptographic challenge to the peripheral device 104-2. For example, the host device 104-1 can send a challenge request derived from a set of challenge parameters (e.g., the MAC addresses of the host device 104-1 and the peripheral device 104-2, clock offset parameters used for the ACL connection mentioned earlier, and/or one or more nonce values). The peripheral device 104-2 is configured, in response to receiving the challenge request, to generate a challenge response, e.g., based on a predetermined algorithm or set of algorithms. The challenge response generation can also make use of the secure data 404, in some examples.

The peripheral device 104-2 is configured to return the challenge response to the host device 104-1, and the host device 104-1 is configured verify whether the challenge response matches an expected challenge response computed at the host device 104-1. When the determination at block 240 is affirmative (e.g., when the challenge responses mentioned above match), the host device 104-1 proceeds to block 245, and the pre-authentication status indicator for the peripheral device 104-2 is set to positive. If the challenge process fails, however (e.g., the peripheral device 104-2 returns a challenge response that does not match the expected response), the host device 104-1 proceeds to block 250, and sets the pre-authentication status for the peripheral device 104-2 to negative.

The pre-authentication mechanism, in other words, results in the selection of a positive or negative pre-authentication status for the peripheral device 104-2 at the host device 104-1. The host device 104-1 can then select between first and second pairing actions according to the pre-authentication status, and at block 255, control the pairing mechanism based on the selected pairing action.

Figure 6:
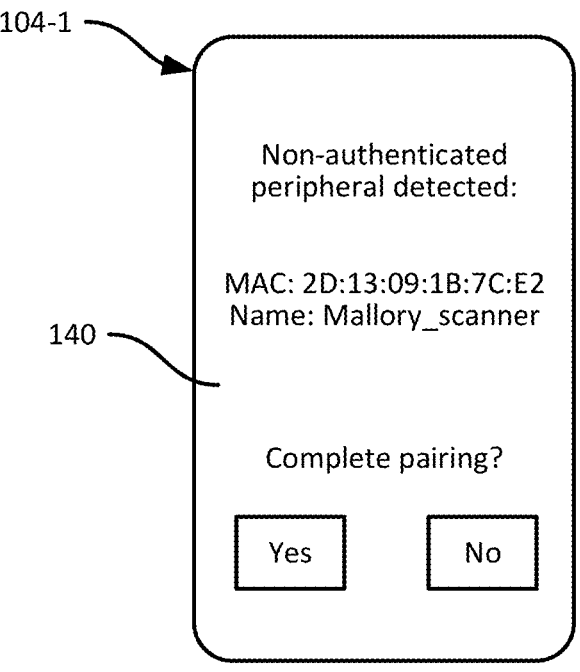
FIG. 6 is a diagram illustrating an example performance of block 255 of the method of FIG. 2, following block 250.

Turning to FIG. 6, an example implementation of a pairing action and resulting pairing control is illustrated, for a negative pre-authentication status set at block 250. For example, the host device 104-1 can be configured to present a notification on the display 140 indicating that a non-authenticated peripheral is attempting to pair with the host device 104-1. The notification can also include one or more identifiers of the peripheral device 104-2 (e.g., a MAC address and/or a name of the device 104-2), and selectable elements (e.g., "Yes", "No") for approving or denying the pairing request. When the "No" element is selected, for example, the pairing mechanism is terminated, and the peripheral device 104-2 is therefore not paired with the host device 104-1.

In other examples, the pairing action selected at block 255 when the pre-authentication status for the peripheral device 104-2 is negative can include terminating the pairing mechanism without notifying the operator of the device 104-1 (e.g., without prompting the operator to approve or deny the pairing attempt).

Figure 7:
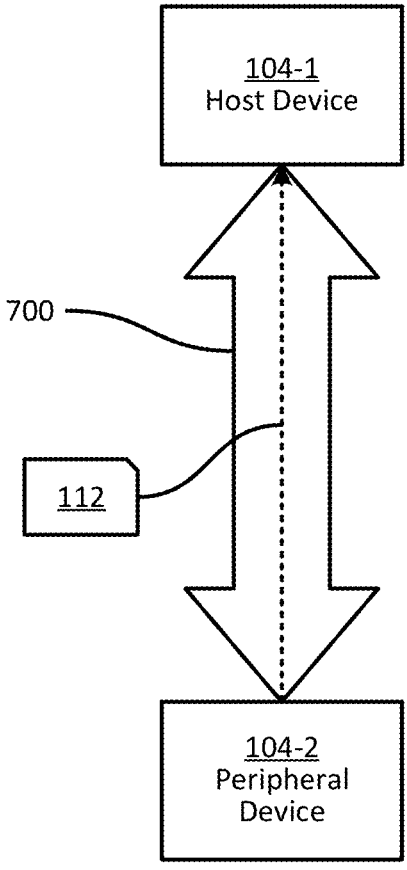
FIG. 7 is a diagram illustrating an example performance of block 255 of the method of FIG. 2, following block 245.

Turning to FIG. 7, when the pre-authentication status for the peripheral device 104-2 is positive, at block 255 the host device 104-1 can select a pairing action that includes silently completing the pairing mechanism, e.g., suppressing notifications to the operator of the host device 104-1. For example, in FIG. 7 the host device 104-1 is shown having established a secured connection 700 with the peripheral device 104-2, over which the data 112 can be exchanged. The host device 104-1 can be configured to establish connection 700 without prompting the operator of the host device 104-1 to approve or deny the pairing of the devices 104-1 and 104-2.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a host computing device of establishing a short-range wireless connection with a peripheral device, the method comprising:

responsive to detecting the peripheral device, initiating a pairing mechanism with the peripheral device;

exchanging attribute data with the peripheral device;

in response to determining, based on the attribute data, that the peripheral device supports a pre-authentication mechanism, exchanging pre-authentication data with the peripheral device;

based on the exchanged pre-authentication data, selecting either (i) a first pairing action or (ii) a second pairing action; and controlling the pairing mechanism according to the selected one of the first pairing action and the second pairing action.

2. The method of claim 1, wherein exchanging the attribute data includes:

transmitting a host indication that the host computing device supports pre-authentication to the peripheral device; and in response to transmitting the first indication, receiving, from the peripheral device, a peripheral indication of whether the peripheral device supports pre-authentication.

3. The method of claim 1, wherein exchanging the pre-authentication data includes: establishing a pre-authentication channel between the host computing device and the peripheral device.

4. The method of claim 3, wherein exchanging the pre-authentication data includes:

generating a local key;

generating a secondary key;

encrypting the secondary key with the local key, and sending the encrypted secondary key to the peripheral device via the pre-authentication channel, for decryption via the local key generated at the peripheral device.

5. The method of claim 4, wherein generating the local key includes:

retrieving secure data from a secure storage component of the host computing device; and generating the local key based on the secure data.

6. The method of claim 1, wherein exchanging the pre-authentication data includes:

determining whether the host computing device and the peripheral device were previously bonded.

7. The method of claim 1, wherein exchanging the pre-authentication data includes:

generating an expected response based on a set of challenge parameters;

sending the set of challenge parameters to the peripheral device;

receiving a candidate response from the peripheral device, and determining whether the candidate response matches the expected response.

8. The method of claim 1, wherein controlling the pairing mechanism according to the first pairing action includes bonding the host computing device and the peripheral device while suppressing pairing notifications.

9. The method of claim 1, wherein controlling the pairing mechanism according to the second pairing action includes presenting a prompt at a display of the host computing device for operator approval or denial of bonding between the host computing device and the peripheral computing device.

10. The method of claim 1, wherein controlling the pairing mechanism according to the second pairing action includes terminating the pairing mechanism without bonding the peripheral device to the host computing device.

11. A computing device, comprising:

a communications interface; and a controller configured to:

responsive to detecting a peripheral device, initiate a pairing mechanism with the peripheral device;

exchange attribute data with the peripheral device;

in response to determining, based on the attribute data, that the peripheral device supports a pre-authentication mechanism, exchange pre-authentication data with the peripheral device;

based on the exchanged pre-authentication data, select either (i) a first pairing action or (ii) a second pairing action; and control the pairing mechanism according to the selected one of the first pairing action and the second pairing action.

12. The computing device of claim 11, wherein the controller is configured to exchange the attribute data by:

transmitting a host indication that the host computing device supports pre-authentication to the peripheral device; and in response to transmitting the first indication, receiving, from the peripheral device, a peripheral indication of whether the peripheral device supports pre-authentication.

13. The computing device of claim 11, wherein the controller is configured exchange the pre-authentication data by:

establishing a pre-authentication channel between the host computing device and the peripheral device.

14. The computing device of claim 13, wherein the controller is configured to exchange the pre-authentication data by:

generating a local key;

generating a secondary key;

encrypting the secondary key with the local key, and sending the encrypted secondary key to the peripheral device via the pre-authentication channel, for decryption via the local key generated at the peripheral device.

15. The computing device of claim 14, wherein the controller is configured to generate the local key by:

retrieving secure data from a secure storage component of the host computing device; and generating the local key based on the secure data.

16. The computing device of claim 11, wherein the controller is configured to exchange the pre-authentication data by:

determining whether the host computing device and the peripheral device were previously bonded.

17. The computing device of claim 11, wherein the controller is configured to exchange the pre-authentication data by:

generating an expected response based on a set of challenge parameters;

sending the set of challenge parameters to the peripheral device;

receiving a candidate response from the peripheral device, and determining whether the candidate response matches the expected response.

18. The computing device of claim 11, wherein the controller is configured to control the pairing mechanism according to the first pairing action by bonding the host computing device and the peripheral device while suppressing pairing notifications.

19. The computing device of claim 11, wherein the controller is configured to control the pairing mechanism according to the second pairing action by presenting a prompt at a display of the host computing device for operator approval or denial of bonding between the host computing device and the peripheral computing device.

20. The computing device of claim 11, wherein the controller is configured to control the pairing mechanism according to the second pairing action by terminating the pairing mechanism without bonding the peripheral device to the host computing device.

* * * * *